(12) United States Patent
Wallstedt et al.

(10) Patent No.: US 10,698,081 B2
(45) Date of Patent: Jun. 30, 2020

(54) RADAR DETECTION AND/OR PROTECTION IN A WIRELESS COMMUNICATION SYSTEM OPERATING IN A SPECTRUM SHARED WITH AT LEAST ONE RADAR SYSTEM

(71) Applicant: Telefonaktiebolaget LM Ericsson (publ), Stockholm (SE)

(72) Inventors: Kenneth Wallstedt, Stocksund (SE); Mikael Prytz, Rönninge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 238 days.

(21) Appl. No.: 15/555,993

(22) PCT Filed: Dec. 11, 2015

(86) PCT No.: PCT/SE2015/051326
§ 371 (c)(1),
(2) Date: Sep. 6, 2017

(87) PCT Pub. No.: WO2016/159852
PCT Pub. Date: Oct. 6, 2016

(65) Prior Publication Data
US 2018/0059213 A1 Mar. 1, 2018

Related U.S. Application Data
(60) Provisional application No. 62/139,216, filed on Mar. 27, 2015.

(51) Int. Cl.
G01S 7/02 (2006.01)
H04K 3/00 (2006.01)
(Continued)

(52) U.S. Cl.
CPC .............. G01S 7/021 (2013.01); H04K 3/226 (2013.01); H04K 3/822 (2013.01); H04W 16/14 (2013.01);
(Continued)

(58) Field of Classification Search
CPC ........ G01S 7/021; H04K 3/822; H04K 3/226; H04K 2203/18; H04K 2203/16; H04W 16/14; H04W 36/0022
(Continued)

(56) References Cited

U.S. PATENT DOCUMENTS 8,548,032 B2   10/2013  Kim
2009/0111388 A1  4/2009  Chen
(Continued)

FOREIGN PATENT DOCUMENTS

EP   1515488 A1   3/2005
GB   2499445 A    8/2013
(Continued)

OTHER PUBLICATIONS

Unknown, Author , "Broadband Radio Access Networks (BRAN); 5 GHz high performance RLAN; Harmonized EN covering the essential requirements of article 3.2 of the R&TTE Directive", ETSI EN 301 893 V1.2.3, Aug. 2003, 1-43.

*Primary Examiner* — Bo Fan
(74) *Attorney, Agent, or Firm* — Sage Patent Group

(57) ABSTRACT

There is provided a method and corresponding arrangement and units for radar detection in a wireless communication system operating in a spectrum shared with at least one radar system. The method basically comprises the steps of collecting (S1) measurement information related to radar sensing measurements by aggregating radar sensing measurements from multiple, geographically distributed radar sensing units forming a radar sensing network implemented
(Continued)

in the wireless communication system, and processing (S2) the measurement information according to at least one radar sensing rule to generate a radar detection result. With this new and fundamental radar detection procedure in place, it may further be beneficial to take action(s) for radar protection and/or dynamic adjustment of radar detection functionalities.

18 Claims, 12 Drawing Sheets

(51) Int. Cl.
*H04W 16/14* (2009.01)
*H04W 36/00* (2009.01)

(52) U.S. Cl.
CPC ..... *H04K 2203/16* (2013.01); *H04K 2203/18* (2013.01); *H04W 36/0022* (2013.01)

(58) Field of Classification Search
USPC ....................................................... 342/159
See application file for complete search history.

(56) References Cited

U.S. PATENT DOCUMENTS

| | | |
|---|---|---|
| 2009/0262004 A1 | 10/2009 | Wen et al. |
| 2012/0263123 A1 | 10/2012 | Turtinen et al. |
| 2013/0064197 A1 | 3/2013 | Novak et al. |
| 2014/0120966 A1* | 5/2014 | Fischer ................. H04K 3/822 455/500 |
| 2015/0036509 A1 | 2/2015 | Lopes et al. |

FOREIGN PATENT DOCUMENTS

| | | |
|---|---|---|
| WO | 2008039872 A2 | 4/2008 |
| WO | 2011087714 A1 | 7/2011 |
| WO | 2014124131 A2 | 8/2014 |
| WO | 2014172150 A1 | 10/2014 |
| WO | 2015034939 A2 | 3/2015 |

* cited by examiner

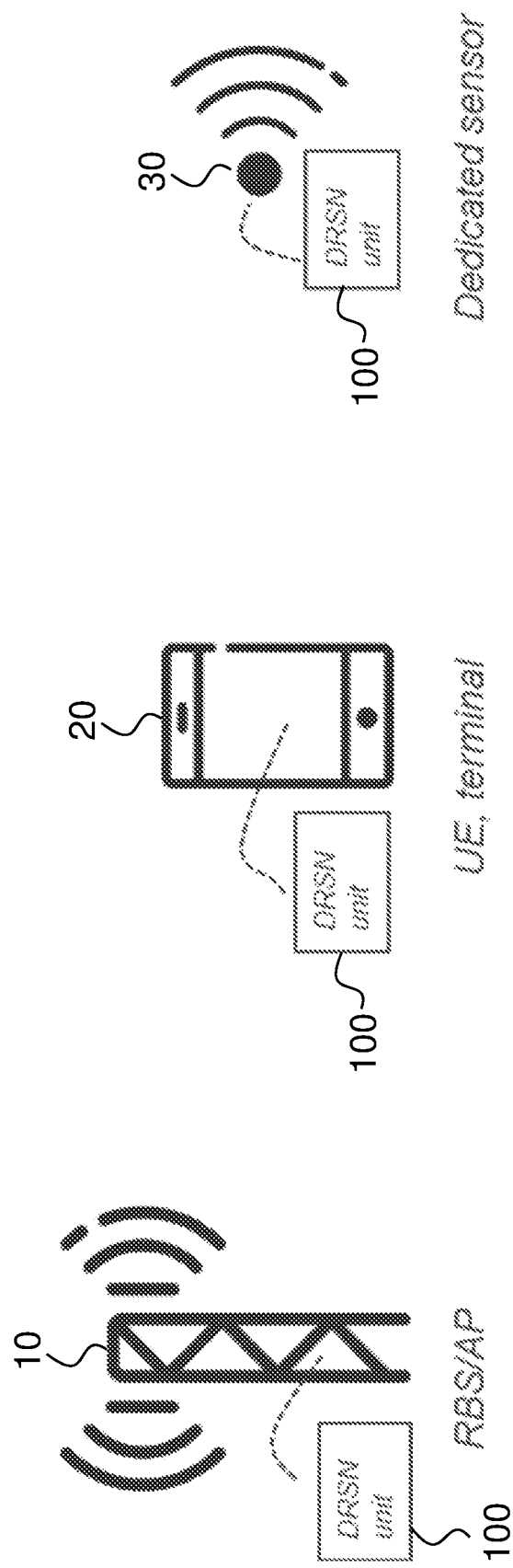

RADAR DETECTION AND/OR PROTECTION IN A WIRELESS COMMUNICATION SYSTEM OPERATING IN A SPECTRUM SHARED WITH AT LEAST ONE RADAR SYSTEM

TECHNICAL FIELD

The proposed technology generally relates to wireless communication systems and radar technology, and especially radar detection and/or protection in a wireless communication system operating in a spectrum shared with at least one radar system.

BACKGROUND

Wireless communication systems today typically operate in spectrum that is either dedicated for each individual system, e.g. mobile networks in block-licensed IMT spectrum, or shared among several, similar systems on an equal-access basis, e.g. Wi-Fi and Bluetooth in license-exempt RLAN/ISM spectrum. Other forms of sharing also exist to a limited extent, e.g., defined by static, geographical exclusion zones.

New forms of sharing are discussed today, including wireless communication system sharing spectrum with one or more radar systems. For example, in the United States the Federal Communications Commission, FCC, is planning to release the 3.5 GHz band (3550 to 3650/3700 MHz) on a nation-wide, shared basis with Department of Defense's existing usage of ship-borne radars used for purposes such as Missile and Gunfire Control, and Long-Range Surveillance and Aircraft Carrier. The conditions of use for (commercial) wireless communications systems will require them to stop transmissions that could interfere any radar currently using the band. Since the radars are ship-borne the set of potentially interfering communications system transmitters can vary when the radar changes its location, particularly if the transmitters are deployed over a large coastal area, as schematically illustrated in FIGS. 1 A-B.

For example, such sharing may be managed by a separate Spectrum Access System, SAS, that can include database functionalities to facilitate handling of when and where radar protection is needed. However, for national security reasons it may not be possible for a SAS to handle information about radar usage.

SUMMARY

It has been recognized that to meet radar protection requirements the sharing wireless communication systems will likely need to independently detect and decide upon radar usage. In addition to effective radar detection it may also be desirable to provide effective radar protection and/or dynamic adjustment of radar detection functionalities.

It is an object to provide a method for radar detection in a wireless communication system operating in a spectrum shared with at least one radar system.

Another object is to provide an arrangement configured for radar detection in a wireless communication system operating in a spectrum shared with at least one radar system.

It is also an object to provide a radar detection unit, also referred to as a radar sensing unit, configured for radar detection in a wireless communication system operating in a spectrum shared with at least one radar system.

Another object is to provide a radar detection unit configured to enable radar detection in a wireless communication system operating in a spectrum shared with at least one radar system.

It is another object to provide a centralized radar detection unit for radar detection in a wireless communication system operating in a spectrum shared with at least one radar system.

Yet another object is to provide a communication unit comprising a radar detection unit.

Still another object is to provide a radar sensing network for radar detection in a wireless communication system operating in a spectrum shared with at least one radar system.

It is an object to provide a computer program for performing, when executed by at least one processor, radar detection in a wireless communication system operating in a spectrum shared with at least one radar system.

It is also an object to provide a corresponding computer-program product.

Another object is to provide an apparatus for radar detection in a wireless communication system operating in a spectrum shared with at least one radar system.

These and other objects are met by embodiments of the proposed technology.

According to a first aspect, there is provided a method for radar detection in a wireless communication system operating in a spectrum shared with at least one radar system. The method basically comprises the steps of collecting measurement information related to radar sensing measurements by aggregating radar sensing measurements from multiple, geographically distributed radar sensing units forming a radar sensing network implemented in the wireless communication system, and processing the measurement information according to at least one radar sensing rule to generate a radar detection result.

With this new and fundamental radar detection procedure in place, it may be beneficial to take action(s) for radar protection and/or dynamic adjustment of radar detection functionalities, especially when combining information about the wireless communication system with information about and/or from the radar sensing network as a basis for deciding on such action(s).

According to a second aspect, there is provided an arrangement configured for radar detection in a wireless communication system operating in a spectrum shared with at least one radar system. The arrangement is configured to collect measurement information related to radar sensing measurements by aggregating radar sensing measurements from multiple, geographically distributed radar sensing units forming a radar sensing network implemented in the wireless communication system. The arrangement is also configured to process the measurement information according to at least one radar sensing rule to generate a radar detection result.

According to a third aspect, there is provided a radar detection unit, also referred to as a radar sensing unit, configured for radar detection in a wireless communication system operating in a spectrum shared with at least one radar system. The radar detection unit is configured to collect measurement information related to radar sensing measurements. The radar detection unit is also configured to process the measurement information according to at least one radar sensing rule to generate a radar detection result. The radar detection unit is part of a radar sensing network implemented in the wireless communication system, and the radar detection unit is further configured to receive radar sensing measurement results from at least one other radar detection unit in the radar sensing network and to aggregate and process the received radar sensing measurement results together with its own radar sensing measurement results to generate the radar detection result.

According to a fourth aspect, there is provided a radar detection unit, also referred to as a radar sensing unit, configured to enable radar detection in a wireless communication system operating in a spectrum shared with at least one radar system. The radar detection unit may be configured to perform at least one radar sensing measurement. The radar detection unit is part of a radar sensing network implemented in the wireless communication system. The radar detection unit is configured to distribute measurement information related to said at least one radar sensing measurement to a centralized radar detection unit to enable the centralized radar detection unit to process the measurement information together with measurement information from at least one other radar detection unit in the radar sensing network to generate a radar detection result.

According to a fifth aspect, there is provided a centralized radar detection unit for radar detection in a wireless communication system operating in a spectrum shared with at least one radar system. The centralized radar detection unit is configured to receive and aggregate radar sensing measurements from multiple, geographically distributed radar sensing units forming a radar sensing network implemented in the wireless communication system. The centralized radar detection unit may be configured to process the measurements according to at least one radar sensing rule to generate a radar detection result.

According to a sixth aspect, there is provided a communication unit comprising a radar detection unit according to the third, fourth or fifth aspect.

According to a seventh aspect, there is provided a radar sensing network for radar detection in a wireless communication system operating in a spectrum shared with at least one radar system. The radar sensing network comprises a multitude of geographically distributed radar sensing units implemented in respective communication units of the wireless communication system, and functionality for aggregating radar sensing measurements from the radar sensing units and functionality for processing the aggregated radar sensing measurements according to at least one radar sensing rule to generate a radar detection result.

According to an eighth aspect, there is provided a computer program for performing, when executed by at least one processor, radar detection in a wireless communication system operating in a spectrum shared with at least one radar system. The computer program comprises instructions, which when executed, cause the at least one processor to:
   collect measurement information related to radar sensing measurements by aggregating radar sensing measurements from multiple, geographically distributed radar sensing units forming a radar sensing network implemented in the wireless communication system;
   process the measurement information according to at least one radar sensing rule to generate a radar detection result.

According to a ninth aspect, there is provided a computer-program product comprising a computer-readable medium having stored thereon a computer program according to the eighth aspect.

According to a tenth aspect, there is provided an apparatus for radar detection in a wireless communication system operating in a spectrum shared with at least one radar system. The apparatus comprises a collecting module for collecting measurement information related to radar sensing measurements by aggregating radar sensing measurements from multiple, geographically distributed radar sensing units forming a radar sensing network implemented in the wireless communication system, and a processing module for processing the measurement information according to at least one radar sensing rule to generate a radar detection result.

In this way, robust radar detection and/or radar protection is provided in an efficient manner.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIGS. 4A-C are schematic diagrams illustrating examples of communication units and devices in which radar sensing or radar detection units may be implemented.

DETAILED DESCRIPTION

Figure 1B:
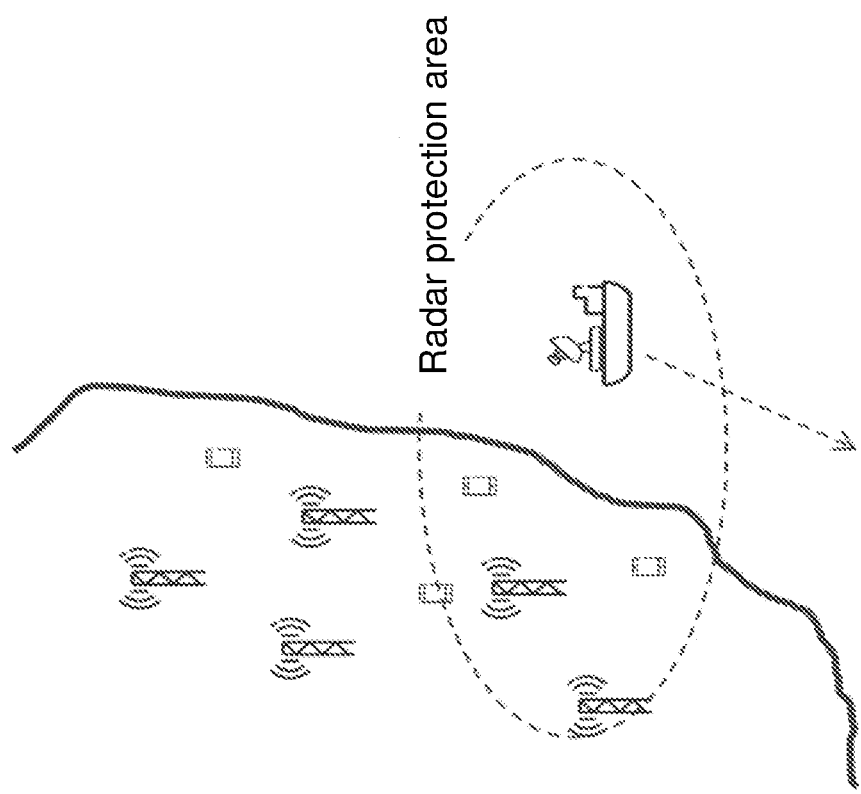
FIGS. 1A-B are schematic diagrams illustrating an example of ship-born naval radar moving along a coastal area.
Figure 1A:
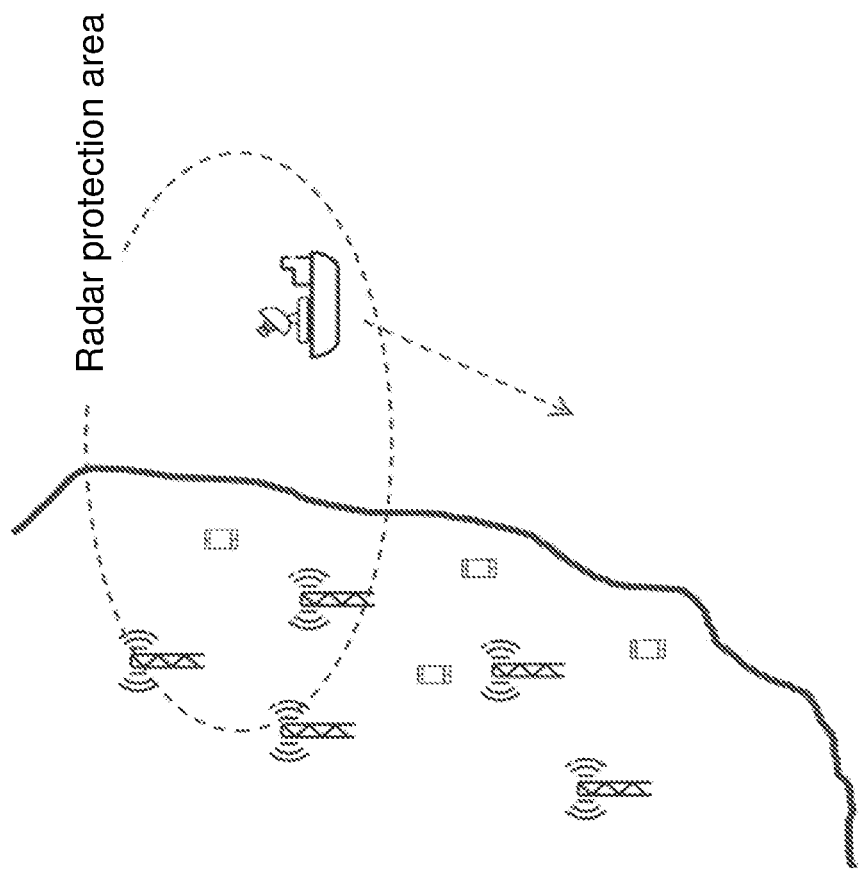

Throughout the drawings, the same reference designations are used for similar or corresponding elements.

It may be useful to start with a brief overview of some of the problems with existing solutions.

Specifications of Wi-Fi systems for the 5 GHz band have since 2004 provided Dynamic Frequency Selection, DFS, functionalities for radar protection, initially through ETSI specifications, e.g. EN 301-893 v1.2.3, for Time Domain Weather Radar stations in Europe and later for defense radars in the US with more stringent and generalized requirements defined by the FCC.

Typical Wi-Fi implementations have functionality, such as receiver hardware capable of detecting and measuring radar pulses and chirps, i.e. frequency sweep signals having a certain pulse width, power, and chip indication, and/or software with a set of state machines that receive interrupts from the hardware and associated processes that determine if sufficient pulses have been detected to match a radar protection requirement profile (e.g., exceeding power threshold −64 dBm, pulse width 1 microsecond, pulse repetition frequency 700 pps). If such a match is found then the transmitter changes channel.

A main difficulty with radar detection for Wi-Fi is false detection. A Wi-Fi unit operates independently and may be in a hidden node scenario. The specifications of radar pulses are (intentionally) poor and do not represent actual waveforms or any stealth technologies, e.g. dithering of radar pulses. Low transmit power and indoor use restrictions can be used as additional mitigation methods.

Some of the problems with existing solutions include:
1. Existing Wi-Fi solutions have been designed to detect radars in the 5 GHz bands of operation with associated protection requirements profiles that do not necessarily cover other types of radars (or sharing systems).
2. Existing solutions are based on a single receiver hardware radar detector co-located with the transmitter unit, which can lead to one or more of the following problems:
   Hidden node situations towards a network of radar receivers.
   Accuracy of detection is limited to the accuracy of the single detector. Improving accuracy by time averaging may also be increasingly difficult when radars use shorter pulse trains.
   Lower wireless system performance when compensating low detector accuracy with, e.g. lower thresholds of detection, which leads to unnecessary time spent in "radar detected" state.
   Reliability of detection depends on the reliability of the receiver hardware circuitry—failure may lead to either radar interference or lost wireless system performance.
   The performance of the wireless systems depends on a single detector position.
3. Existing solutions do not consider detection of radar systems that move over large geographical areas, in particular along coastlines, or where sharing wireless communications systems are deployed over nationwide territories.
4. Existing solutions utilize external, database systems such as the SAS for the US 3.5 GHz band, that may not be compatible with national security policies.

As previously indicated, it has been recognized that to meet radar protection requirements the sharing wireless communication systems will likely need to independently detect and decide upon radar usage.

The proposed technology generally relates to wireless communication systems and radar technology, and especially a method, radar detection unit, apparatus and radar sensing network for radar detection in a wireless communication system operating in a spectrum shared with at least one radar system, as well as a corresponding computer program and computer-program product.

Expressed slightly differently, the proposed technology relates to methods, communication equipment, sensing units and systems for shared spectrum operation of wireless communication systems. By way of example, there are provided methods for detecting conflicting radar signals utilizing sensors in one or multiple network devices. The proposed technology also covers the aspect of dynamic reconfiguration of the operation of the wireless communication system and/or radar detection operation based on measurements from a radar sensing network.

Figure 2A:
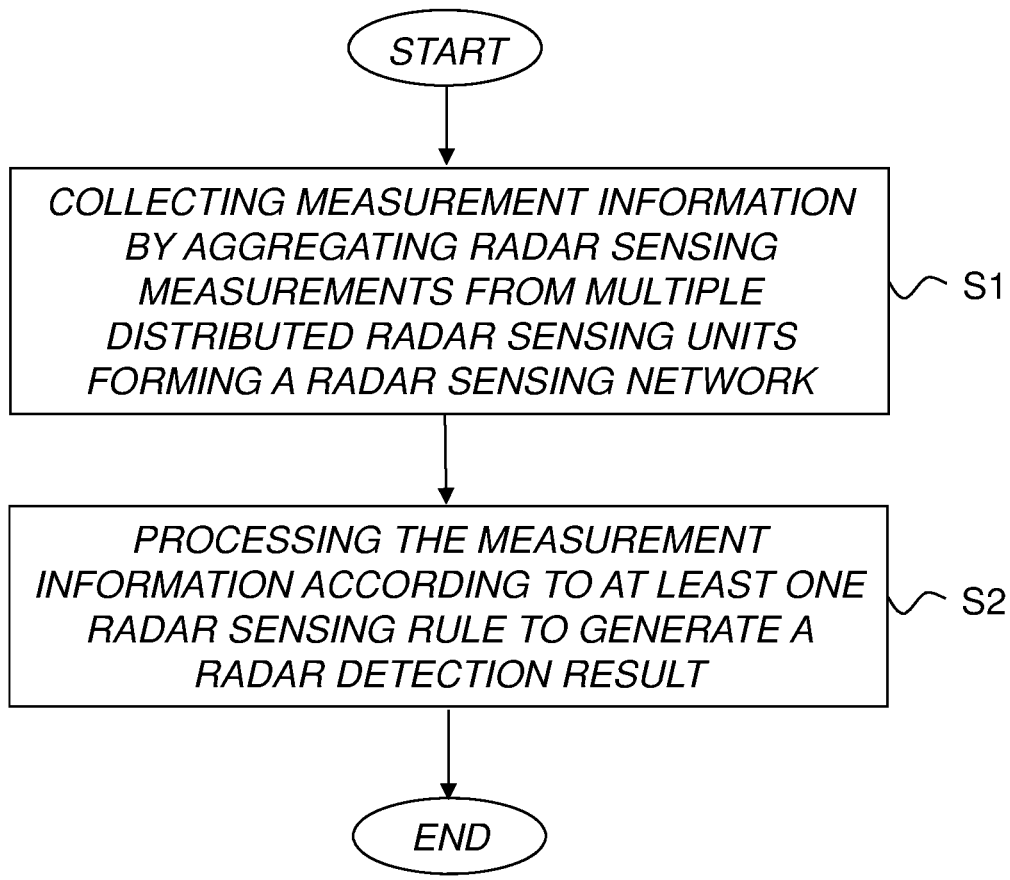
FIG. 2A is a schematic flow diagram illustrating an example of a method for radar detection in a wireless communication system operating in a spectrum shared with at least one radar system.

FIG. 2A is a schematic flow diagram illustrating an example of a method for radar detection in a wireless communication system operating in a spectrum shared with at least one radar system. The method basically comprises the following steps:

S1: Collecting measurement information related to radar sensing measurements by aggregating radar sensing measurements from multiple, geographically distributed radar sensing units forming a radar sensing network implemented in the wireless communication system.

S2: Processing the measurement information according to at least one radar sensing rule to generate a radar detection result.

By way of example, the radar sensing units are implemented in communication units of the wireless communication system.

For example, the communication units may include network nodes such as radio base stations and similar radio access points, and/or user equipment such as mobile stations or equivalent wireless communication devices.

In other words, the radar sensing network may be introduced in a wireless communication network and deployed as additional functionalities in communication network equipment and utilizing communication and control capabilities of the network.

Figure 2B:
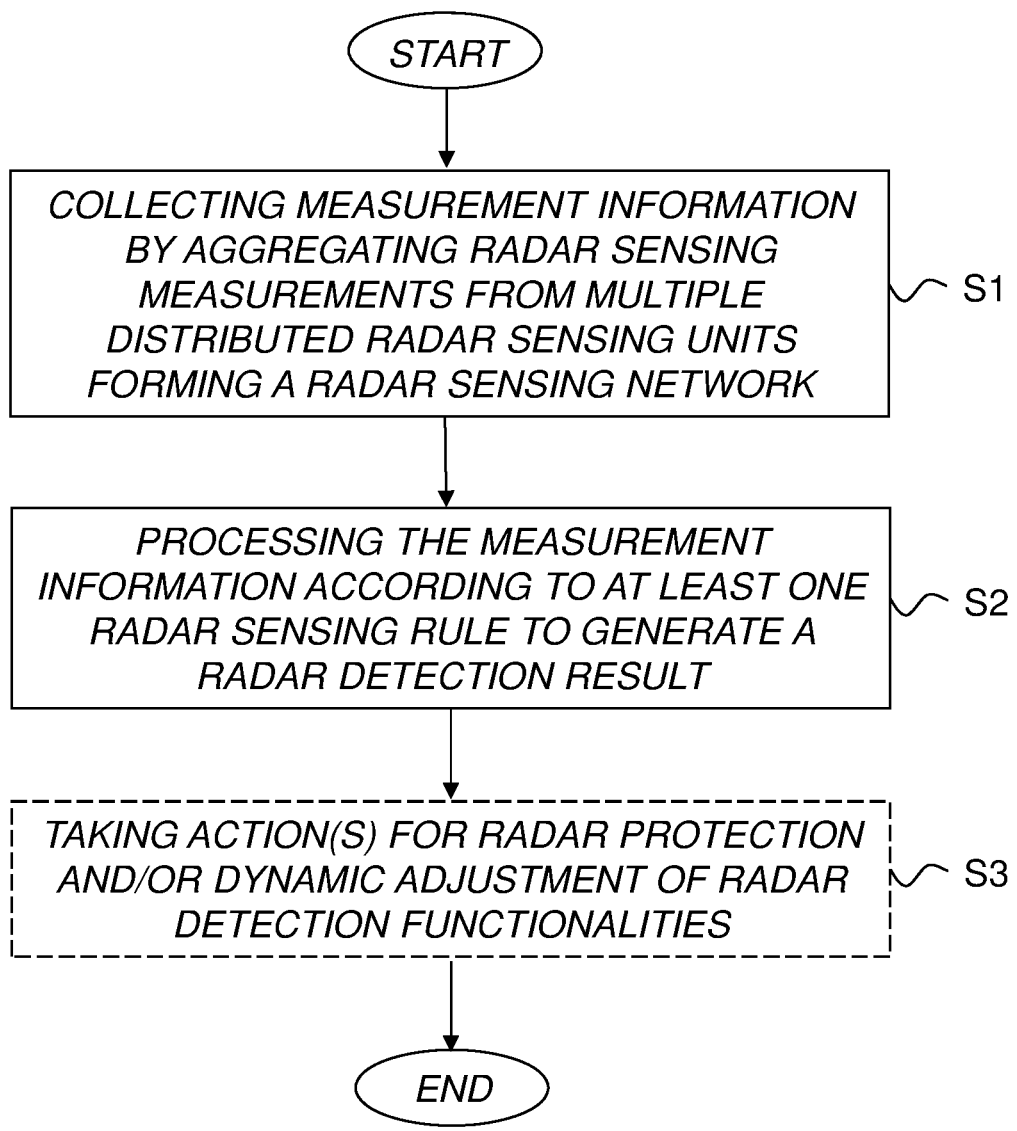
FIG. 2B is a schematic flow diagram illustrating an example of a method for radar detection according to another embodiment.

With this fundamental radar detection procedure in place, it may be desirable to take action(s) for radar protection and/or dynamic adjustment of radar detection functionalities, as indicated by optional step S3 in FIG. 2B.

It may also be beneficial to perform one or more radar protective actions such as controlling the operation of the wireless communication system based on the radar detection result. Thus, the step of taking action(s) for radar protection and/or dynamic adjustment of radar detection functionalities includes controlling the operation of the wireless communication system based on the radar detection result.

In a particular example, the step of taking action(s) for radar protection and/or dynamic adjustment of radar detection functionalities includes:
   adapting and/or configuring radio resource management in the wireless communication system, based on the radar detection result, and/or
   adapting and/or configuring transmitter characteristics of at least one communication unit in the wireless communication system, based on the radar detection result, and/or
   selectively, depending on the radar detection result and/or information about the wireless communication network, block transmission on one or more shared spectrum channels.

Preferably, information about the wireless communication system may be combined with information about and/or from the radar sensing network as a basis for deciding on the action(s).

For example, the information about the wireless communication system comprises radio network information, wherein the radio network information may include:
   information regarding the positions of base stations and/or user equipment, antenna information such as information on antenna types, antenna heights and directions,
information on beam directions,
information on transmit power, and/or
information on whether the deployment is an indoor or outdoor deployment.

By way of example, it may be beneficial to adapt the radar sensing measurements and/or the aggregation of measurements, and/or adapt the processing of the measurement information related to the aggregated radar sensing measurements.

This may for example be performed based on the deployment, configuration and/or operation of the wireless communication system or parts thereof, and/or based on the collected measurement information and/or the radar detection result.

As an example, the method may comprise adapting and/or configuring the sensing rule(s) and/or associated parameters, based on the radar detection result, including adapting and/or configuring the measurement rate(s), sensing threshold(s) and/or desired accuracy.

In a particular example, as already mentioned, the radar sensing units may be implemented in communication units of the wireless communication system such as radio base stations, access points, user equipment, mobile stations or equivalent wireless communication devices.

As used herein, the general term "communication unit" may refer to network nodes and/or network equipment such as radio base stations and similar radio access points, as well as user equipment such as mobile stations or equivalent wireless communication devices. In particular, the term "user equipment" and the term "wireless communication device" should be interpreted as non-limiting terms comprising any type of wireless device communicating with a radio network node in a cellular or mobile communication system or any device equipped with radio circuitry for wireless communication according to any relevant standard for communication.

It may also be useful to determine when and/or where aggregated measurements are to be performed, i.e. determining timing and/or location(s) for radar sensing measurements. By way of example, the step of determining when and/or where aggregated measurements are to be performed may involve determining from which nodes or radar sensing units of the radar sensing network to collect radar sensing measurements.

It may also be possible to control how the radar sensing units should be operated.

The radar sensing measurements may possibly performed at multiple occasions over time.

At least some of the radar sensing measurements will typically originate from a local neighborhood area or possibly a wider network area covered by the radar sensing network. Preferably, the method is adapted for detecting radar operation of a moving radar system such as ship-borne naval radar.

In this case, as an example, the step of processing the measurement information according to at least one radar sensing rule to generate a radar detection result comprises determining whether a radar signal is detected in the neighborhood of any of the multiple radar sensing units of the radar sensing network.

For example, the method may be performed by a local radar sensing unit, and the step of collecting measurement information comprises combining own measurement results with measurement results received from other radar sensing units.

The local radar sensing unit may also distribute its own measurement results to other radar sensing unit(s).

Alternatively, the method may be performed by a centralized unit, which collects relevant measurement information by receiving and aggregating radar sensing measurements from multiple radar sensing units. The centralized unit processes the collected measurement information according to at least one radar sensing rule to generate a radar detection result.

The centralized unit may then forward the detection result to one or more of the geographically distributed radar sensing units.

As mentioned, the proposed technology also provides the possibility of smart adaptation. For example, adapting and/or configuring radio resource management in the wireless communication system, possibly based on the radar detection result. Alternatively, or as a complement, adapting and/or configuring transmitter characteristics of at least one communication unit in the wireless communication system, possibly based on the radar detection result. For example, it may be possible to selectively, depending on the radar detection result and/or information about the wireless communication network, block transmission on one or more shared spectrum channels.

More generally, the proposed technology may involve protecting the operation of the radar system(s) by controlling the operation of at least one communication unit of the wireless communication system, preferably based on the radar detection result.

As mentioned, it is possible to combine information about the wireless communication system (radio network information such as information about deployment, capabilities and/or operation of the radio network or parts thereof) with information about and/or from the radar sensing network for improved radar detection and/or radar protection.

For example, radio network information can be combined with information on the radar sensing network for radar detection and/or radar protection purposes. Radar protection typically involves controlling the operation of one or more communication units of the radio network such as base stations and/or other wireless communication devices. The radio network information may include i) information regarding the positions of base stations and/or user equipment such as mobile terminals, ii) antenna information such as information on antenna types, antenna heights and directions (tilt changeable), iii) information on beam directions (changeable), information on transmit power (changeable) and/or iv) information on whether the deployment is an indoor or outdoor deployment, and so forth.

For example, when radar sensing units are co-located with communication units of the wireless communication system such as base stations and/or wireless communication devices, the location of the radar sensing unit comes "for free" if we have information on the location or position of the communication units. Normally, the exact coordinates of fixed base stations are available and the coordinates of UEs may also be obtained. This type of position information may be valuable input for various reasons, as described herein, including geographic information about the actual radar detection, predictions of where to perform radar measurements and so forth.

By way of example, if a radar is sensed (e.g. by one or more of the distributed radar sensing units of the radar sensing network) at a certain distance from a radio base station, RBS, or similar access point, AP, and the RBS or AP operates at high power, with directional antenna and/or is an outdoor deployment, it would be highly beneficial to change the operation of the RBS or AP, e.g. changing the frequency use and/or transmit power. On the other hand, if the RBS or AP operates at low power, with no directional antenna and/or is an indoor deployment, and the aggregated processing determines it to be safe from a radar operation perspective, it may not be necessary to change the operation of the RBS or AP.

It may also be beneficial to perform radar sensing measurements more frequently and/or more accurately, to make sure that a moving radar system can be reliably detected in advance and radar-conflicting radio network operation can be avoided accordingly.

In particular, the spatial separation of the radar sensing units enables prediction of where the radar will be and enables proactive steps, such as initiating more intense measurements, or turn off transmission(s).

As an example, if a moving radar system is approaching, the radio network or a suitable radio network unit such as a base station or access point or a suitable controller may take proactive actions to protect the radar operation. For example, it could be possible to proactively change communications from the frequency on which the radar is operating to other one or more alternative frequencies having available capacity.

In a particular example, the method may further involve adapting and/or configuring the sensing rule(s) and/or associated parameters, possibly based on the radar detection result. For example, this may involve adapting and/or configuring the measurement rate(s), sensing threshold(s) and/or desired accuracy. By way of example, it may be desirable to increase the measurement rate, e.g. if a radar signal is expected to be detected. In the latter case, the measurement rate in a particular set of one or more radar sensing units can be increased provided that a radar system has been detected in geographically close radar sensing units and/or based on estimated or otherwise known radar usage patterns.

Alternatively, the method may be performed by a local radar sensing unit, and the step of collecting measurement information comprises performing radar sensing measurement(s) in the local radar sensing unit and storing the corresponding measurement information for processing.

For a better understanding of the proposed technology reference can be made to the following non-limiting examples.

A so-called Dynamic Radar Sensing Network, DRSN, is introduced in a wireless communication network that operates in spectrum shared with one or more moving radar systems (at least one radio carrier in the shared spectrum). The radar sensing network is deployed as additional functionalities in the communication network equipment such as Radio Base Stations, Access Points, UEs, terminals, devices, possibly complemented with dedicated equipment, and utilizes the existing communication and control capabilities of the network.

The DRSN detects radar operation (location, direction, trends) in the band with high confidence through processing of measurements into sensing results, and by combining measurements from multiple units and possibly over time when and where this is needed. The combination can be done in a local neighborhood or over a larger region through a central control unit.

Radar operation may be protected by adapting the radio resource management of the communications network, e.g. turning on or off operation in the shared channels for the relevant transmitters, as determined by the sensing result and/or by the network deployment and/or transmitter characteristics.

In general, the operation of the wireless communication system or at least part thereof and/or the operation of the radar sensing network or at least part thereof may be adapted based on the collected radar sensing measurements and/or the radar detection result(s) and/or information related to the deployment and configuration of the wireless communication system such as locations of radio base stations and/or user terminals, whether a radio network deployment is configured for indoor/outdoor, transmit power information, and/or antenna pattern/beam directions/antenna diagrams. Pro-active management based on sensing results, trends, and known usage patterns can be used.

For example, Dynamic Frequency Selection, DFS, and/or Transmit Power Control, TPC, may be used to minimize the communication system's influence on the radar signals.

The DRSN operation may optionally be optimized by dynamically adapting sensing rules and parameters (e.g., measurement rates, sensing thresholds, desired accuracy) and adapting the processing modes (the extents to which combination of measurement results are made).

The proposed technology may provide one or more of the following:

A solution for a wireless communications network to detect moving radar operation in a shared spectrum band, to possibly adapt its operation in the shared spectrum band depending on the detection results and its own characteristics, and to possibly adapt its radar detection functionalities dynamically.

Solves radar protection problem with high confidence and without relying on an external, database system (such as the SAS).

Improved statistical confidence in radar detection, which leads to:

Fewer measurements per RBS/AP per unit of time (uses less RX resources).

Possibility of using cheaper hardware.

Better utilization of network (e.g. more certain on when to stop transmitting).

Higher confidence that the network will not interfere the radar or for redundancy (can be traded for e.g. cheaper hardware).

Default low sensing measurement rate, but when something is detected in the surrounding area, it is possible to increase the measurement rate increases, e.g. for a few minutes.

Saves receiver resources/capacity/power.

The spatial separation enables prediction of where the radar will be.

Possibility to make proactive steps, such as initiating more intense measurements, or turn off transmission(s).

The proposed technology applies to any communication network that utilizes radio channels in spectrum shared with radars that can move around, in particular naval radars operating along coastal lines over large geographical areas. Examples of communication network technologies include cellular systems, such as based on LTE, LTE-A, WCDMA, and emerging 5G standards specifications, and WLAN, Wi-Fi systems, such as systems based on 802.11 specifications, in particular performance- and coverage-enhanced and mesh network versions such as systems based on 802.11ax and 802.11k/.11s/.11-2012.

Figure 3:
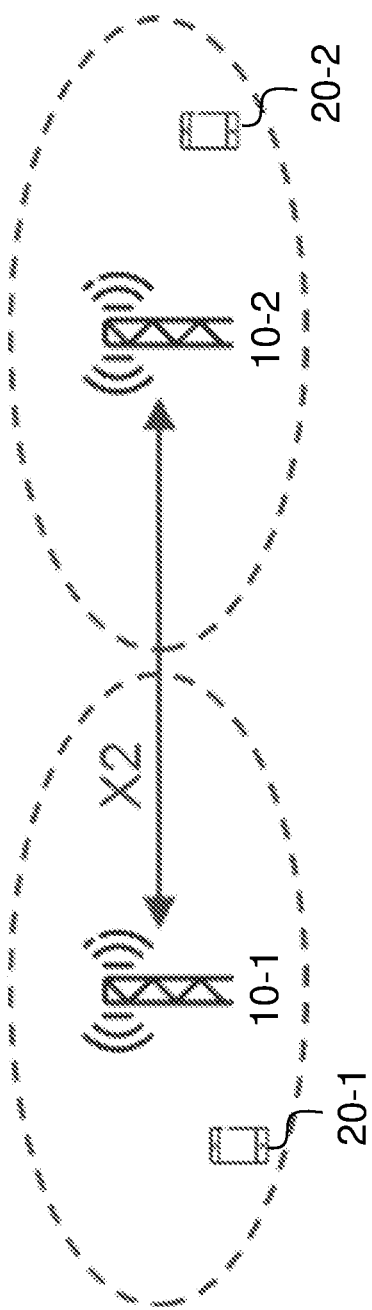
FIG. 3 is a schematic diagram illustrating an example of a communication interface between base stations or equivalent access points that can be used for exchanging information.

FIG. 3 is a schematic diagram illustrating an example of a communication interface between base stations or equivalent access points that can be used for exchanging information. In this example, there are two base stations 10-1 and 10-2 serving user equipment or similar wireless devices 20-1 and 20-2, respectively. The base stations 10-1 and 10-2 are interconnected through an X2 interface.

Individual Radio Base Stations, RBS, or Access Points, AP, in the communication systems above have network control functionalities and can communicate either to:

- One or more central nodes, e.g., a Radio Network Controller or an aggregation gateway.
- With each other to different degrees, e.g., between neighboring RBSs/APs or everyone-to-everyone. An example is LTE base stations exchanging control messages over the X2 interface, see FIG. 3.

These network control and communication functionalities may be utilized in some of the aspects described herein.

Examples of Implementation

A Dynamic Radar Sensing Network, DRSN, for radar detection and protection may be introduced into the communication systems described above such that:

- Deployed RBS/APs 10, or at least a fraction of the deployed RBS/APs, each has a DRSN unit 100, also generally referred to as radar sensing unit or a radar detection unit, that includes radar sensing equipment including for example receiver hardware capable of detecting the appropriate radar signal (e.g. as defined by one or more radar requirements protection profiles) through energy detection, or by other detection means, see FIG. 4A. The receiver hardware can be dedicated hardware for the purpose, or it can be the same receiver hardware used for receiving signals from the User Equipment, UE, terminals, stations, devices, and so forth of the communication system, possibly enhanced with additional detection and protection functionality.
- UE terminals, stations, devices, 20 and so forth can also have a DRSN unit 100 and be part of the sensing network, see FIG. 4B.
- Dedicated radar detector sensors 30, i.e. not located in RBS/APs or UE terminals, each with a DRSN unit 100, can be also part of the sensing network, see FIG. 4C. These can be placed in strategic locations, e.g., along the coastline, to give early warnings on approaching radars.

Possibly, the DRSN unit 100 may further include one or more of the following:

- Means for configuration of a set of sensing rules and parameters, described below.
- Capabilities for processing of sensing measurements, described below.
- Communication capabilities with other DRSN units and/or DRSN control nodes, used to send measurements and processing results and for configuration of sensing rules and parameters, further described below.
- Means to impact the radio resource management operation of the communication system, described below.

Examples of Sensing Rules and Parameters

The set of sensing rules and parameters span the DRSN and can be different for different DRSN units. These rules and parameters define how and when each DRSN unit should operate, and can include specifications of one or more of the following:

- Which radar detection requirements profile to use (if defined).
- Sensing thresholds to use (e.g., energy level threshold, pulse width threshold, pulse repetition threshold).
- The time and/or frequency resources, such as time slots, for which sensing measurements should be made.
- The sensing/measurement rates.
- Desired sensing accuracy (and/or false detection probability).
- How the sensed/measured signals should be processed, the analysis and processing mode of the DRSN unit.

Which specific rules and parameters to use for each DRSN unit depends on, e.g., the current sensing situation, the type of unit (part of RBS/AP, part of UE, dedicated sensor, and so forth), and the location of the unit. The rules and parameters can also be adapted dynamically, see below.

For more information on how to detect radar signals, reference can for example be made to U.S. Pat. No. 8,548,032 and US 2009/0262004.

Examples of Modes of Operation

Figure 5B:
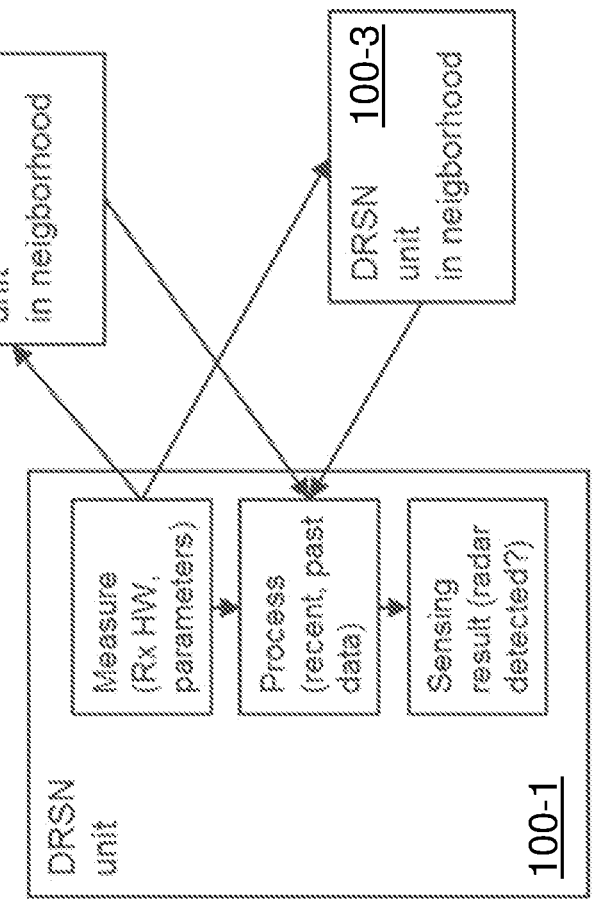
FIG. 5A-B are schematic diagrams illustrating examples of different modes of operation of a radar sensing unit or radar detection unit.
Figure 5A:
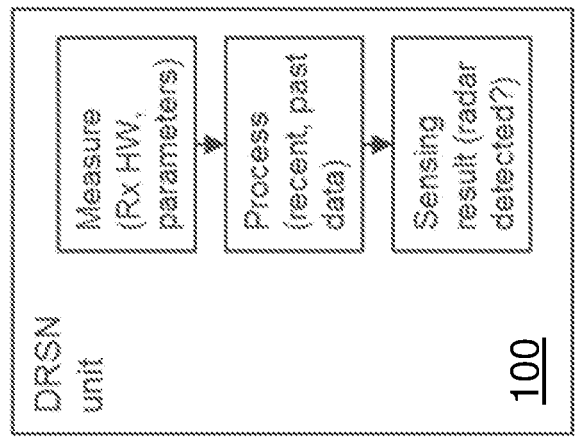
Figure 6:
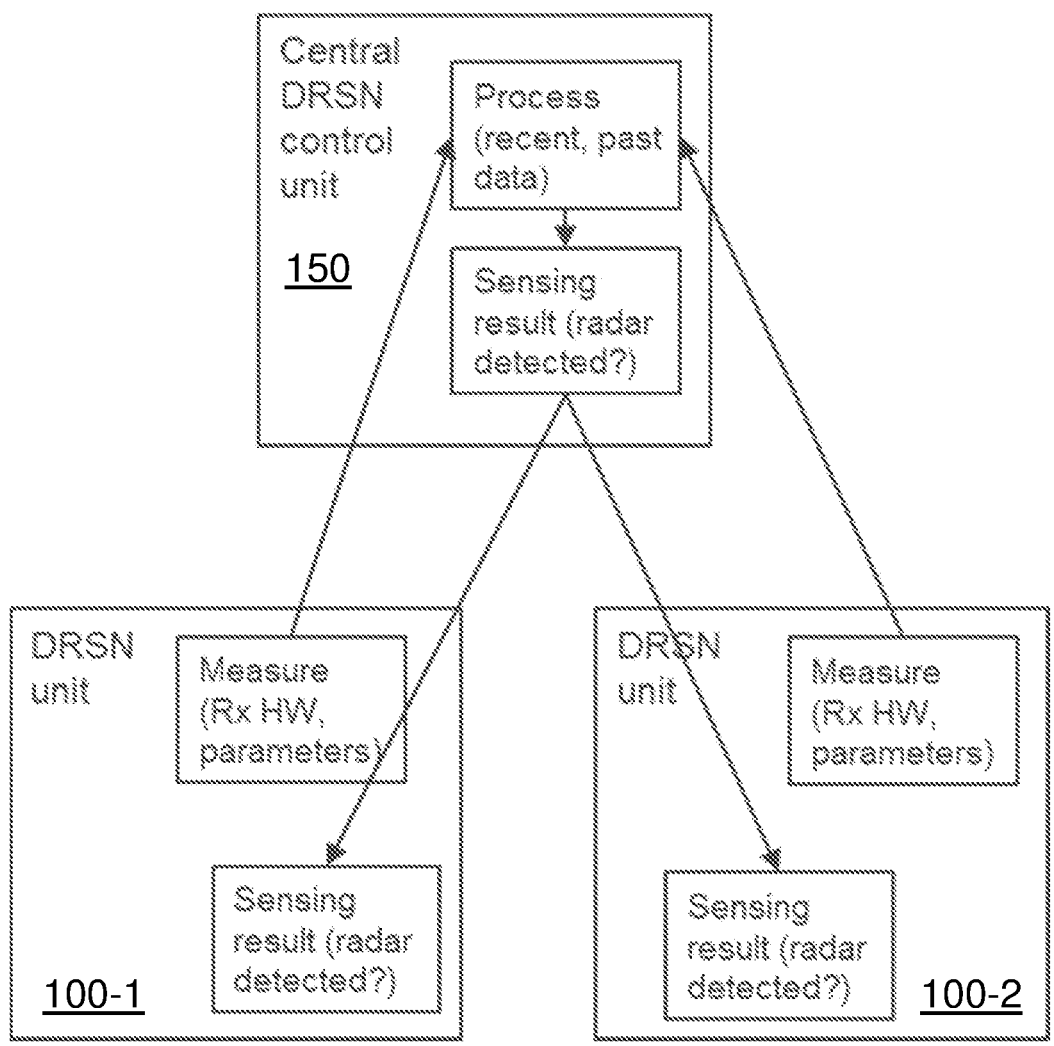
FIG. 6 is a schematic diagram illustrating an example of a central processing mode of a radar detection unit.

Each DRSN unit can be configured to operate in one or more different analysis/processing modes, including:

1. Local processing, local measurements (fully local): Measurements results from the DRSN unit 100 are analyzed and processed locally in the unit, see FIG. 5A.
2. Local processing, neighborhood/aggregated measurements: Measurements results from different DRSN units are distributed to neighboring units and/or other units. The neighborhood can be defined, e.g., in geographical terms (DRSN units within a physical distance) or by network topology (DRSN units reachable via one control communication link). Each DRSN unit 100-1 combines its own measurements results with results received from other DRSN units 100-2, 100-3, see FIG. 5B.
3. Central processing: Measurement results from a large set of different DRSN units 100-2, 100-2 covering a larger area are distributed to a central DRSN control unit 150 that combines and processes all or a selected part of the received results. The combined result may then be distributed to all contributing local DRSN units or a selected set thereof, see FIG. 6

The central DRSN control unit 150 in the central processing mode can be one of the normal DRSN units 100, or it can be part of a separate node specifically used for the purpose. More than one central DRSN control unit 150 can exist (e.g., one per larger geographical region such as a state), in which case each DRSN unit is configured to communicate with one of the central DRSN control units.

The choice of analysis/processing mode in a particular DRSN unit may for example depend on or more of the following parameters:

- Desired sensing accuracy (and/or false detection probability). Combined processing of measurements from many DRSN units in an area increases the statistical confidence in the results.
- Reliability of the receiver hardware measurement unit.
- The sensing parameters (e.g., local mode can be sufficient if a low sensing threshold is used).
- The deployment location of the unit (e.g., unit with line-of-sight conditions to the moving radars such as along the coast-line).
- The recent radar detection level in the neighborhood (e.g., local mode can be sufficient if no radars have been detected in the area for a period of time).

The selected mode can be configured permanently or adapted dynamically.

A radar sensing unit in the radar sensing network may thus be able to switch from one operating mode to another, e.g. changing mode from i) collecting measurements from neighboring radar sensing units to ii) transferring measurements to a central unit or node. In this way, the degree of centralization may be dynamically adapted, e.g. selecting between a purely local mode of operation, a neighborhood-oriented mode of operation and a centralized mode of operation.

Examples of DSRN Operation and Actions

Figure 7:
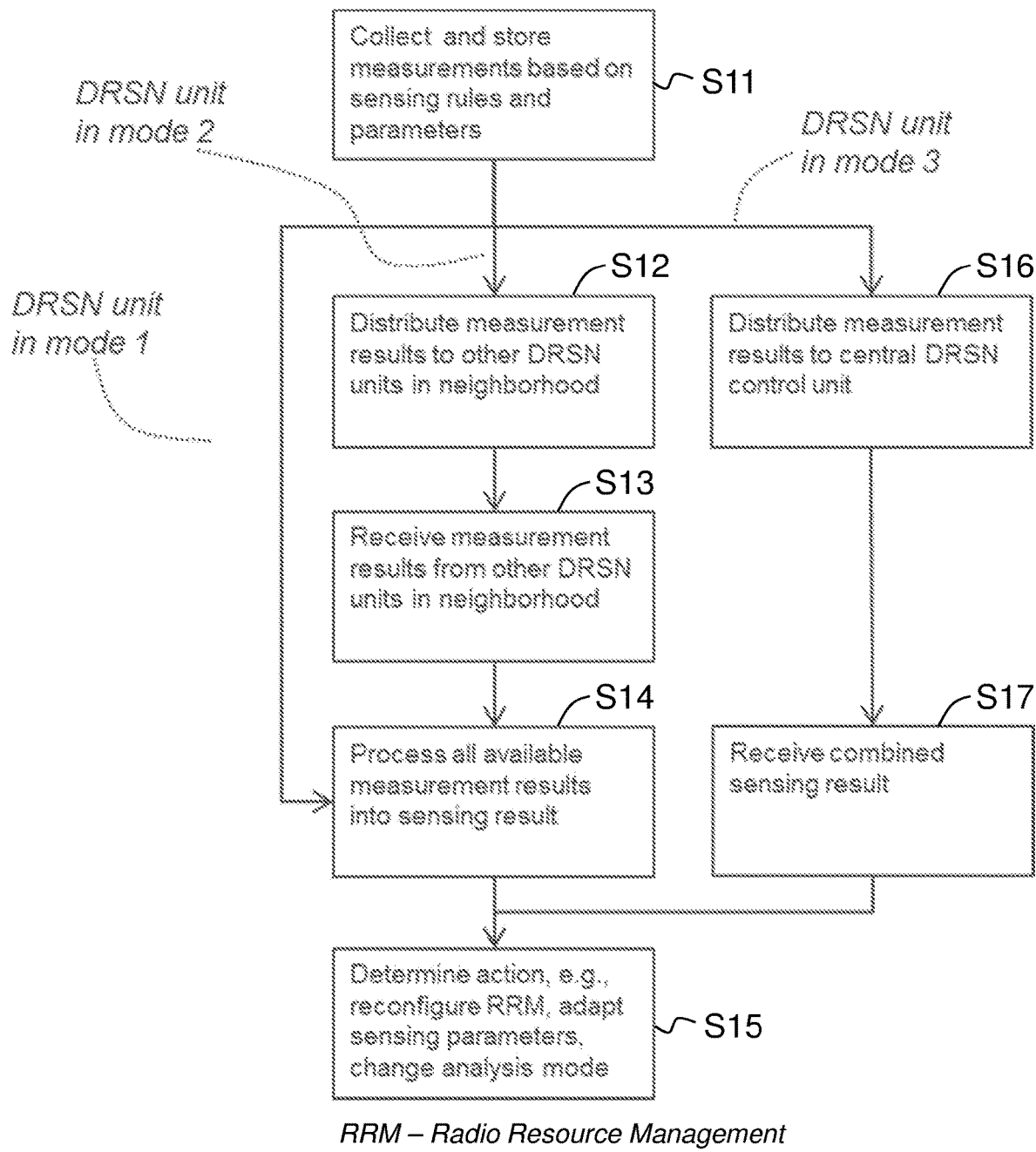
FIG. 7 is a schematic flow diagram illustrating a particular example of a method for radar detection and/or protection in three alternative modes of operation.
Figure 8:
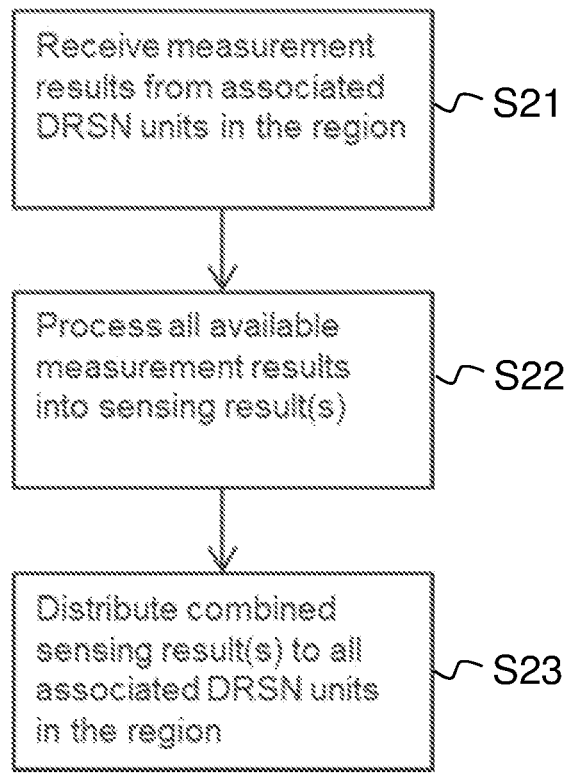
FIG. 8 is a schematic flow diagram illustrating a particular example of a method of centralized radar detection.

FIG. 7 and FIG. 8 summarizes the operation as flowcharts for the DRSN units, and the central DRSN control units respectively.

FIG. 7 is a schematic flow diagram illustrating a particular example of a method for radar detection and/or protection in three alternative modes of operation, as described above.
1. Sensing/measurements
   a. Measurements are collected in step S11 by DRSN units according to their defined sets of sensing rules and parameters, see above. Past measurements can also be stored to detect trends and to improve statistical properties.
2. Analysis/processing
   a. DRSN units that are in analysis/processing mode 1 (fully local)
      i. Process the own recent and past measurements into a sensing result, in step S14, primarily determining if a radar signal has been detected or not in the vicinity of the DRSN unit. The sensing result can also include an estimate of the probability of detection, processed physical sensing data (e.g., average detected energy), recent sensing activity, or any other data.
   b. DRSN units that are in analysis/processing mode 2 (local processing using neighborhood measurements)
      i. Distribute, in step S12, their own recent measurement results to other DRSN units in the neighborhood using established network control and communication functionalities (e.g. the X2 interface between LTE eNodeB base stations).
      ii. Receive, in step S13, measurement results from other DRSN units in the neighborhood, using communication functionalities as above.
      iii. Process, in step S14, the own and received measurement results, both recent and past that have been stored, into a combined sensing result, primarily determining if a radar signal has been detected or not in the neighborhood of DRSN units (as above). The statistical confidence is typically higher with a combined sensing result. As for mode 1 additional data may be part of the sensing result, and can, e.g., include estimates of where in the neighborhood the radar is detected and in which direction the radar is moving.
   c. DRSN units that are in analysis/processing mode 3 (central processing)
      i. Distribute, in step S16, own measurement results to the central DRSN control unit using established network control and communication functionalities (as above).
      ii. Optionally receive, in step S17, combined sensing results from the central DRSN control unit, using communication functionalities as above.
   d. Central DRSN control units used to support analysis/processing mode 3 (central processing)
      FIG. 8 is a schematic flow diagram illustrating a particular example of a method of centralized radar detection, based on a central DRSN control unit handling a number of associated DSRN units distributed over a geographical region.
      i. Receive, in step S21, measurement results from DRSN units using established network control and communication functionalities (as above).
      ii. Process, in step S22, all received measurement results or a selected part thereof, recent and/or past that have been stored, into one or more combined sensing results, primarily determining if a radar signal has been detected in the larger region covered by the central DRSN control unit (as above). More than one (primary) result can be used if different parts of the region have different characteristics, e.g., different density of DRSN units. The statistical confidence is typically higher with a combined sensing result. As for mode 1 additional data may be part of the sensing result, and can, e.g., include estimates of where in the region the radar is detected and in which direction the radar is moving.
      iii. Optionally distribute, in step S23, the combined result to the associated DRSN units, using communication functionalities as above.
3. Actions. Depending on the sensing result(s), different actions can be determined and taken in step S15 (FIG. 7):
   a. Transmissions on one or more shared spectrum channels for certain RBS/APs, and for associated UEs, terminals, stations, etc., can be (temporarily) blocked/evacuated and/or the transmit power can be adapted to minimize the influence on the radar signals, when the radar is detected. Alternatively the transmissions can be again allowed when the radar is no longer present.
   Suitable control messages can be generated and used internally (e.g. within a base station) and/or possibly transferred to the relevant communication units (e.g. to user terminals) to control the operation of the respective communication unit(s).
      i. The affected RBS/APs and UEs, terminals, devices are typically located where the radar is detected. The choice can further depend on, e.g., the maximum transmit power of the transmitters, the deployment location (indoor or outdoor), the antenna diagram, beam patterns, etc. Additional protection margins or geographical protection zones can be applied. Pro-active selection of nodes can also be determined based on estimates of radar movements (as determined by the combined processing options above).
      ii. The DRSN unit configures the radio resource management (RRM) functionalities, e.g. to turn on or off the shared spectrum channels and/or adapt the transmit power to be used. The RRM functions can be in the same node (e.g., an LTE eNodeB) and/or involve further control signaling (e.g., a base station configuring a UE or terminal, or a base station communicating with a Radio Network Controller).
   b. The sensing rules and parameters can be adapted for certain RBS/APs, UE terminals, and/or dedicated sensor units, e.g., the measurement rate of a particular unit can be increased if radar signals can be expected (detection in other geographically close sensor units, known radar usage patterns, etc) or the sensing threshold can be lowered or increased depending on estimates of detection accuracy.
      i. The DRSN unit updates its own sensing rules and parameters. The central DRSN control unit can also attach update instructions to local DRSN unit sensing rules and parameters when it is distributing its combined sensing result(s).
   c. The analysis and processing mode of a DRSN unit can be changed. For example, a DRSN unit in fully local mode can be configured to receive measurement results from neighboring units as well, or to send its measurement results to a central unit for analysis/processing. A detector unit along the coastline can in this way trigger in-land units to enhance their combined detection capability.
  i. The DRSN unit updates its own mode, or receives instructions from a central DRSN control unit together with the combined sensing result(s).
  ii. The updated mode of a particular DRSN unit is also configured in neighboring DRSN units or in a central DRSN control unit as needed so as to enable or disable the distribution of measurement results.

The proposed technology may provide one or more of the following benefits:
Integration with a wireless communications network, utilizing the existing control and communication capabilities of the wireless communications network.
Enables operation of the wireless communication network in spectrum shared with moving radars, without using any external, spectrum access database systems.
Protects radar operation with high confidence by:
  Combining measurement results from multiple locations when and where needed, improving reliability and minimizing false detection probabilities.
  Determining the correct set of transmitters that needs control of shared spectrum channel usage, depending on transmitter types and deployment locations and/or factors such as transmit power, indoor/outdoor, antenna diagrams/beam directions, and so forth.
  Aggregated control of transmitters, e.g. base station managing radio resource usage of all controlled UEs.
  Pro-active management based on sensing results, trends, known usage patterns, and so forth.
Optimizes opportunities for shared spectrum operation by dynamically adapting the radar protection areas following radar operation.
Minimizes resources spent on radar sensing by dynamically adapting sensing rules and parameters, and modes of operation.

US 2013/0064197 relates to dynamic coordination of radio resource usage in a wireless network environment based on sensory data associated with multiple radio channels relative to one or more radio elements using multiple radio access technologies.

US 2015/0036509 relates to authorized shared access, ASA, operation, and a method including receiving measurement reports from wireless devices operating in a specific area and operating on a spectrum different from an ASA spectrum, and adjusting a configuration of one or more wireless devices operating on the ASA spectrum based on the measurement reports.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to a second aspect, there is provided an arrangement configured for radar detection in a wireless communication system operating in a spectrum shared with at least one radar system. The arrangement is configured to collect measurement information related to radar sensing measurements by aggregating radar sensing measurements from multiple, geographically distributed radar sensing units forming a radar sensing network implemented in the wireless communication system. The arrangement is also configured to process the measurement information according to at least one radar sensing rule to generate a radar detection result.

By way of example, the radar sensing units may be implemented in communication units of the wireless communication system.

For example, the communication units may include network nodes such as radio base stations and similar radio access points, and/or user equipment such as mobile stations or equivalent wireless communication devices.

In other words, the radar sensing network may be introduced in a wireless communication network and deployed as additional functionalities in communication network equipment and utilizing communication and control capabilities of the network.

In a particular example, the arrangement may further be configured to adapt the operation of the wireless communication system or at least part thereof and/or the operation of the radar sensing network or at least part thereof based on the collected radar sensing measurements and/or the radar detection result(s) and/or information related to the deployment and configuration of the wireless communication system.

For example, the information related to the deployment and configuration of the wireless communication system may include information on locations of radio base stations and/or user terminals, whether a radio network deployment is configured for indoor/outdoor, transmit power information, and/or antenna pattern/beam directions/antenna diagrams.

As an example, the arrangement may be configured to employ Dynamic Frequency Selection, DFS, and/or Transmit Power Control, TPC, to minimize the communication system's influence on the radar signals.

In another example, the arrangement is further configured to adapt the radar sensing measurements and/or the aggregation of measurements, and/or adapt the processing of the measurement information related to the aggregated radar sensing measurements.

For example, the arrangement may be configured to adapt and/or configure the sensing rule(s) and/or associated parameters, based on the radar detection result, including adapting and/or configuring the measurement rate(s), sensing threshold(s) and/or desired accuracy.

Preferably, the arrangement is configured for detecting radar operation of a moving radar system.

The proposed technology also provides a radar detection unit, also referred to as a radar sensing unit, configured for radar detection in a wireless communication system operating in a spectrum shared with at least one radar system. The radar detection unit is configured to collect measurement information related to radar sensing measurements. The radar detection unit is also configured to process the measurement information according to at least one radar sensing rule to generate a radar detection result. By way of example, the radar detection unit may be part of a radar sensing network implemented in the wireless communication system, and the radar detection unit is further configured to receive radar sensing measurement results from at least one other radar detection unit in the radar sensing network and to aggregate and process the received radar sensing measurement results together with its own radar sensing measurement results to generate the radar detection result.

The radar detection unit may also be configured to distribute its own radar sensing measurement results to at least one other radar detection unit for processing.

In an optional embodiment, the radar detection unit is configured to adapt and/or configure radio resource management in the wireless communication system, possibly based on the radar detection result.

Alternatively, or as a complement, the radar detection unit may be configured to adapt and/or configure transmitter characteristics of at least one communication unit in the wireless communication system, possibly based on the radar detection result. As an example, the radar detection unit may be configured to adapt and/or configure the sensing rule(s) and/or associated parameters, possibly based on the radar detection result.

For example, the radar detection unit may be configured to adapt and/or configure the measurement rate(s), sensing threshold(s) and/or desired accuracy.

In a particular example, the radar detection unit may be a centralized unit, which is configured to receive and aggregate radar sensing measurements from multiple, geographically distributed radar detection units forming part of the radar sensing network.

By way of example, the radar detection unit may be configured to determine when and/or where radar sensing measurements are to be performed.

In particular, the radar detection unit may be configured to determine from which radar detection units to collect radar sensing measurements.

For example, the radar detection unit may be implemented in a communication unit of the wireless communication system.

Preferably, the radar detection unit is adapted to detect radar operation of a moving radar system.

In a particular example, the radar detection unit as discussed herein comprises a processor and a memory, the memory comprising instructions executable by the processor, whereby the processor is operative to detect radar operation and/or enable radar detection.

The proposed technology also provides a complementary radar detection unit, also referred to as a radar sensing unit, configured to enable radar detection in a wireless communication system operating in a spectrum shared with at least one radar system. The radar detection unit may be configured to perform at least one radar sensing measurement. The radar detection unit is part of a radar sensing network implemented in the wireless communication system. The radar detection unit is configured to distribute measurement information related to said at least one radar sensing measurement to a centralized radar detection unit to enable the centralized radar detection unit to process the measurement information together with measurement information from at least one other radar detection unit in the radar sensing network to generate a radar detection result.

The radar detection unit may further be configured to receive information representative of the radar detection result from the centralized radar detection unit.

By way of example, the radar detection unit may be implemented in a communication unit of the wireless communication system.

As an example, the radar detection unit may be adapted to enable detection of a moving radar system.

In a particular example, the radar detection unit may comprise a processor and a memory, the memory comprising instructions executable by the processor, whereby the processor is operative to detect radar operation and/or enable radar detection.

Preferably, the radar detection unit may be part of a radar sensing network that comprises multiple radar detection units.

This complementary radar detection unit may correspond to a radar detection unit as described above when operated in a particular operating mode.

In another aspect, there is provided a centralized radar detection unit for radar detection in a wireless communication system operating in a spectrum shared with at least one radar system. The centralized radar detection unit is configured to receive and aggregate radar sensing measurements from multiple, geographically distributed radar sensing units forming a radar sensing network implemented in the wireless communication system. The centralized radar detection unit may be configured to process the measurements according to at least one radar sensing rule to generate a radar detection result.

By way of example, the centralized radar detection unit may also be configured to forward the detection result to one or more of the geographically distributed radar sensing units.

As already indicated, there is also provided a communication unit comprising a radar detection unit as discussed herein.

As already indicated, the communication unit may be a network node such as a radio base station and similar radio access point, and/or user equipment such as a mobile station or equivalent wireless communication device.

According to another aspect, there is provided a radar sensing network for radar detection in a wireless communication system operating in a spectrum shared with at least one radar system. The radar sensing network comprises a multitude of geographically distributed radar sensing units implemented in respective communication units of the wireless communication system, and functionality for aggregating radar sensing measurements from the radar sensing units and functionality for processing the aggregated radar sensing measurements according to at least one radar sensing rule to generate a radar detection result.

In other words, the radar sensing network is configured to aggregate the radar sensing measurements from the radar sensing units and to process the aggregated radar sensing measurements to generate a radar detection result.

By way of example, as previously indicated, the communication units may include network nodes such as radio base stations and similar radio access points, and/or user equipment such as mobile stations or equivalent wireless communication devices.

Expressed differently, the radar sensing network is introduced in a wireless communication network and deployed as additional functionalities in communication network equipment and utilizing communication and control capabilities of the network.

In a particular example, the functionality for aggregating radar sensing measurements and the functionality for processing the aggregated radar sensing measurements are implemented in one or more communication units of the wireless communication system.

By way of example, the radar sensing network may also be configured for protecting the operation of the radar system(s) by controlling the operation of at least one communication unit of the wireless communication system based on the radar detection result.

Figure 9:
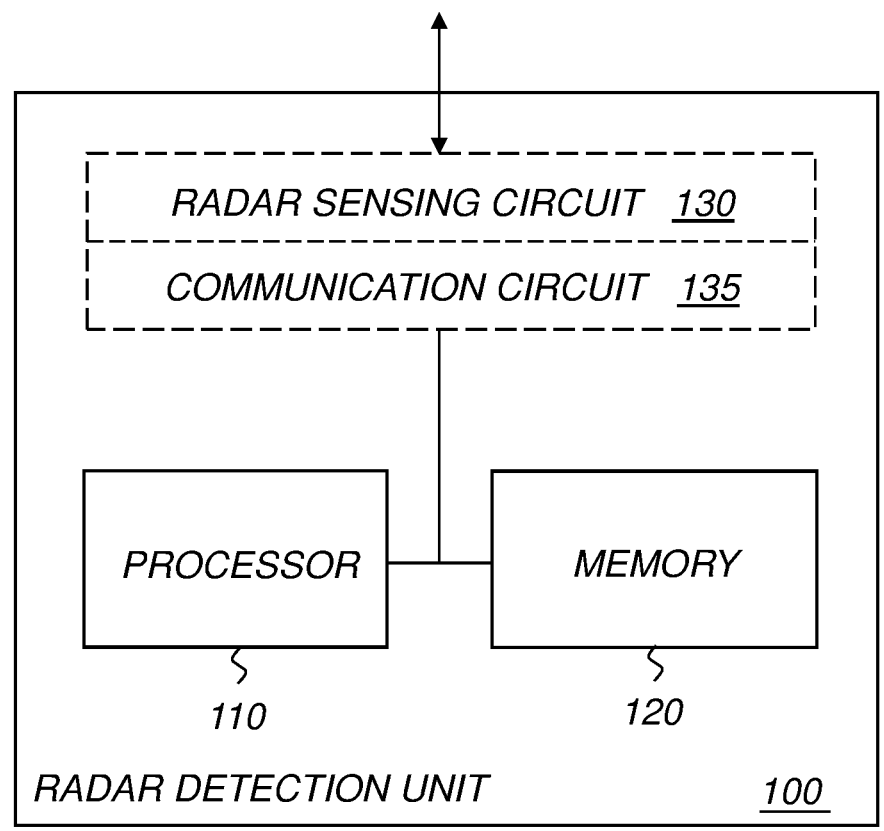
FIG. 9 is a schematic block diagram illustrating an example of a radar detection unit.

FIG. 9 is a schematic block diagram illustrating an example of a radar detection unit. In this particular example, the radar detection unit 100 as discussed herein comprises a processor 110 and a memory 120, the memory comprising instructions executable by the processor, whereby the processor is operative to detect radar operation and/or enable radar detection.

The radar detection unit 100 may also include a radar sensing circuit 130 and/or a communication circuit 135. The radar sensing circuit 130 may include functions for sensing radar signals, and the communication circuit 130 may include functions for wired and/or wireless communication with other devices and/or network nodes in the network. The circuits 130, 135 may be interconnected to the processor 110 and/or memory 120.

Figure 10:
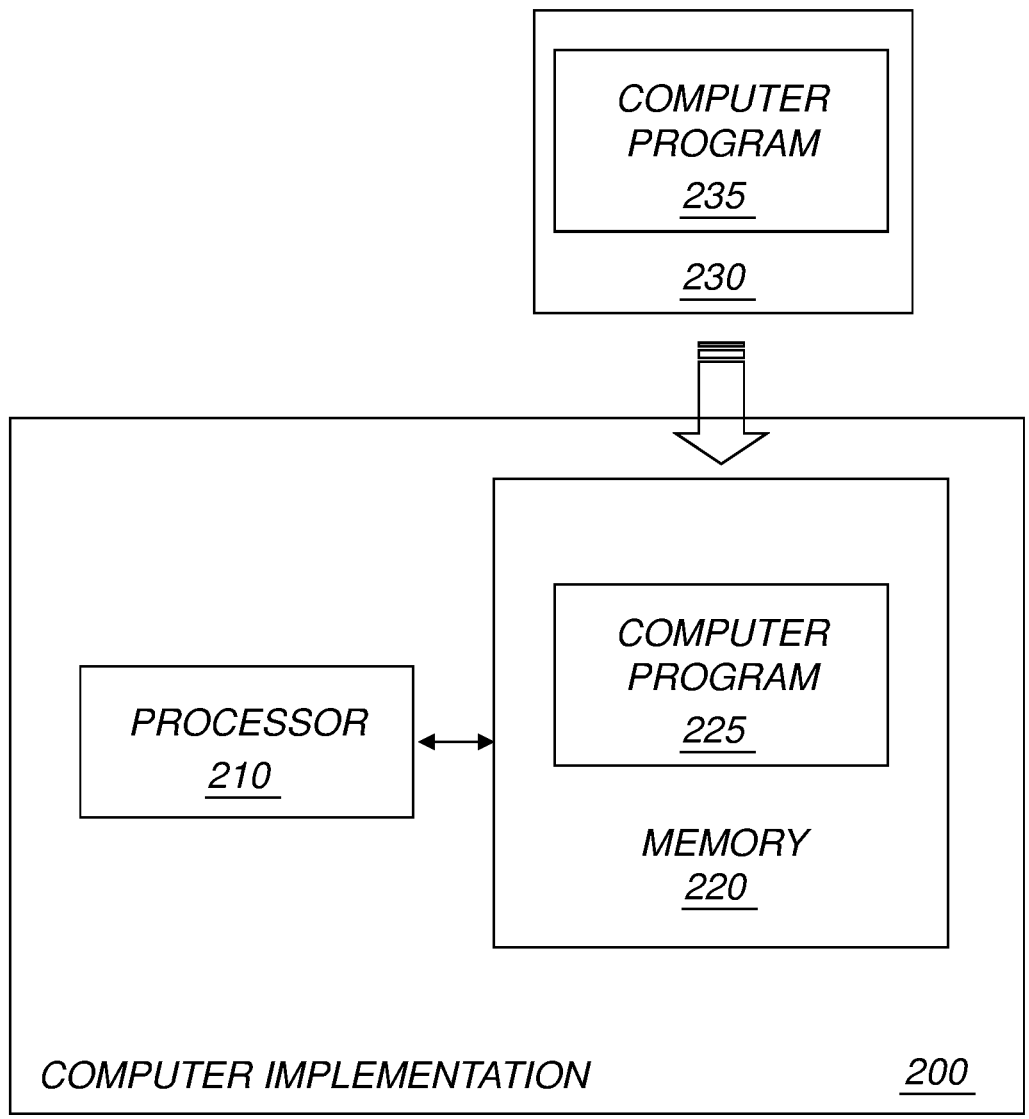
FIG. 10 is a schematic diagram illustrating an example of computer implementation according to an embodiment.

FIG. 10 is a schematic diagram illustrating an example of computer implementation according to an embodiment.

In this particular example, at least some of the steps, functions, procedures, modules and/or blocks described herein are implemented in a computer program 225; 235, which is loaded into the memory 220 for execution by processing circuitry including one or more processors 210. The processor(s) 210 and memory 220 are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

According to a complementary aspect, there is provided a computer program for performing, when executed by at least one processor, radar detection in a wireless communication system operating in a spectrum shared with at least one radar system.

The computer program comprises instructions, which when executed, cause the at least one processor to:
collect measurement information related to radar sensing measurements by aggregating radar sensing measurements from multiple, geographically distributed radar sensing units forming a radar sensing network implemented in the wireless communication system;
process the measurement information according to at least one radar sensing rule to generate a radar detection result.

In a particular example, the computer program may also comprise instructions, which when executed, cause the at least one processor to adapt and/or configure radio resource management in the wireless communication system based on the radar detection result.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

In a particular aspect, there is provided a computer-program product comprising a computer-readable medium having stored thereon a computer program as described herein.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagrams presented herein may be regarded as computer flow diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 11:
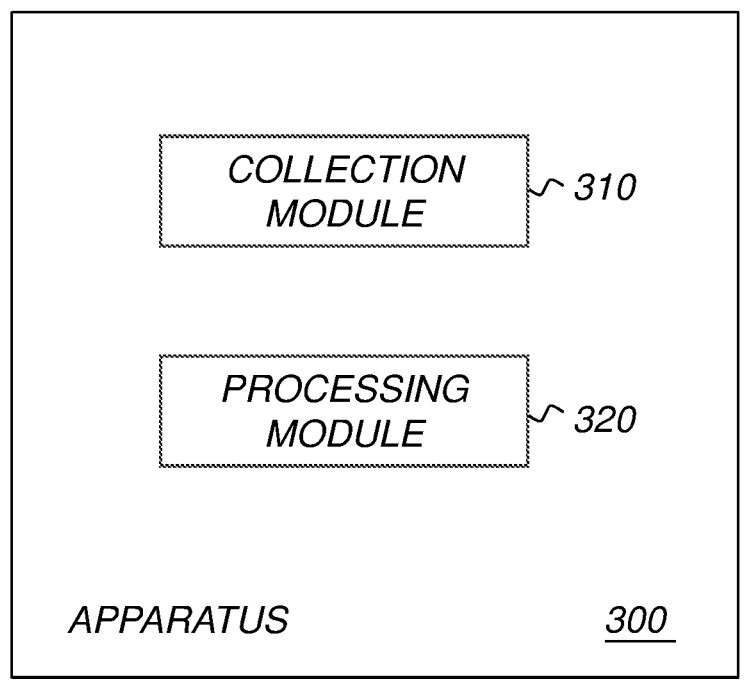
FIG. 11 is a schematic diagram illustrating an example of an apparatus for radar detection in a wireless communication system operating in a spectrum shared with at least one radar system.

FIG. 11 is a schematic diagram illustrating an example of an apparatus for radar detection in a wireless communication system operating in a spectrum shared with at least one radar system. The apparatus 300 comprises a collecting module 310 for collecting measurement information related to radar sensing measurements by aggregating radar sensing measurements from multiple, geographically distributed radar sensing units forming a radar sensing network implemented in the wireless communication system, and a processing module 320 for processing the measurement information according to at least one radar sensing rule to generate a radar detection result.

In a particular example, the processing module 320 may also be adapted for controlling radio resource management in the wireless communication system based on the radar detection result.

Alternatively it is possibly to realize the modules in FIG. 11 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method of operation by a network node of a wireless communication network operating in a spectrum that is also used for radar systems, the method comprising:
   receiving radar sensing measurements from a plurality of radar sensing units of a radar sensing network that are distributed within a geographic area over which the wireless communication network provides radio coverage;
   determining a radar protection area in dependence on which radar sensing units are associated with radar sensing measurements indicating radar-system activity, the radar protection area encompassing one or more communication units, each communication unit being a radio access point of the wireless communication network or a User Equipment (UE) operative to communicatively couple to the wireless communication network; and
   adapting radio resource usage by the one or more communication units in the radar protection area, with respect to radio resources corresponding to the detected radar-system activity,
      wherein adapting the radio resource usage by the one or more communication units in the radar protection area comprises controlling radio resource usage by the one or more communication units, to avoid using frequency channels that conflict with the detected radar-system activity.

2. The method of claim 1, wherein adapting the radio resource usage comprises adapting Radio Resource Management (RRM) by at least one radio access point of the wireless communication network, to avoid conflicting usage of the radio resources corresponding to the detected radar-system activity, or to reduce transmission powers used by the at least one radio access point when transmitting on the radio resources corresponding to the detected radar-system activity, wherein a radio coverage area of the at least one radio access point comprises or overlaps the radar protection area.

3. The method of claim 1, wherein receiving the radar sensing measurements comprises receiving the radar sensing measurements from at least one radio access point of the wireless communication network.

4. The method of claim 3, wherein at least some of the radar sensing units in the plurality of radar sensing units are implemented in respective UEs, such that receiving the radar sensing measurements from the at least one radio access point comprises receiving radar sensing measurements forwarded from the respective UEs by the at least one radio access point.

5. The method of claim 1, wherein at least some of the radar sensing units are implemented in respective radio access points of the wireless communication network, and wherein receiving the radar-sensing measurements comprises receiving radar-sensing measurements from the respective radio access points.

6. The method of claim 1, wherein determining the radar protection area comprises identifying, in dependence on which radar sensing units are associated with the radar sensing measurements indicating the radar-system activity, a location of the radar-system activity and identifying one or more radio coverage areas of the wireless communication network that include the location and the corresponding one or more radio access points that provide the identified one or more radio coverage areas.

7. The method of claim 6, wherein adapting the radio resource usage by the one or more communication units in the radar protection area comprises controlling the corresponding one or more radio access points to reduce uplink or downlink transmission powers on the radio resources corresponding to the detected radar-system activity, or to avoid uplink or downlink usage of the radio resources corresponding to the detected radar-system activity.

8. The method of claim 1, wherein determining the radar protection area comprises predicting movement of a radar system corresponding to the detected radar-system activity, the predicting based on detection times of the radar-system activity at respective ones among the radar sensing units that are associated with the radar-sensing measurements indicating the radar-system activity, and setting or adapting the radar protection area to account for the predicted movement.

9. The method of claim 1, further comprising, in response to the detected radar-system activity, adapting radar sensing operations to increase how often radar sensing measurements are made by one or more ones of the radar sensing units associated with the radar sensing measurements indicating the radar-system activity, or by one or more ones of the radar sensing units that neighbor the radar sensing units associated with the radar sensing measurements indicating the radar-system activity.

10. A network node configured for operation in a wireless communication network operating in a spectrum that is also used for radar systems, the network node comprising: input/output circuitry configured to receive radar sensing measurements from a plurality of radar sensing units of a radar sensing network that are distributed within a geographic area over which the wireless communication network provides radio coverage; and
   processing circuitry operatively associated with the input/output circuitry and configured to:
      determine a radar protection area in dependence on which radar sensing units are associated with radar sensing measurements indicating radar-system activity, the radar protection area encompassing one or more communication units, each communication unit being a radio access point of the wireless communication network or a User Equipment (UE)

operative to communicatively couple to the wireless communication network; and adapt radio resource usage by the one or more communication units in the radar protection area, with respect to radio resources corresponding to the detected radar-system activity, wherein, to adapt the radio resource usage by the one or more communication units in the radar protection area, the processing circuitry is configured to control radio resource usage by the one or more communication units, to avoid using frequency channels that conflict with the detected radar-system activity.

11. The network node of claim 10, wherein, to adapt the radio resource usage, the processing circuitry is configured to adapt Radio Resource Management (RRM) by at least one radio access point of the wireless communication network, to avoid conflicting usage of the radio resources corresponding to the detected radar-system activity, or to reduce transmission powers used by the at least one radio access point when transmitting on the radio resources corresponding to the detected radar-system activity, wherein a radio coverage area of the at least one radio access point comprises or overlaps the radar protection area.

12. The network node of claim 10, wherein the radar sensing measurements originate from at least one radio access point of the wireless communication network, and wherein the input/output circuitry is configured to receive signaling conveying the radar sensing measurements, the signaling sent from the at least one radio access point or sent from one or more other nodes in the wireless communication network that communicatively couple the at least one radio access point to the network node.

13. The network node of claim 12, wherein at least some of the radar sensing units in the plurality of radar sensing units are implemented in respective UEs, such that the corresponding radar sensing measurements originate from the respective UEs.

14. The network node of claim 10, wherein at least some of the radar sensing units are implemented in respective radio access points of the wireless communication network, and wherein the input/output circuitry is configured to receive the radar-sensing measurements as signaling sent from or forwarded from the respective radio access points.

15. The network node of claim 10, wherein, to determine the radar protection area, the processing circuitry is configured to identify, in dependence on which radar sensing units are associated with the radar sensing measurements indicating the radar-system activity, a location of the radar-system activity and identify one or more radio coverage areas of the wireless communication network that include the location and the corresponding one or more radio access points that provide the identified one or more radio coverage areas.

16. The network node of claim 15, wherein, to adapt the radio resource usage by the one or more communication units in the radar protection area, the processing circuitry is configured to control the corresponding one or more radio access points to reduce uplink or downlink transmission powers on the radio resources corresponding to the detected radar-system activity, or to avoid uplink or downlink usage of the radio resources corresponding to the detected radar-system activity.

17. The network node of claim 10, wherein, to determine the radar protection area, the processing circuitry is configured to predict movement of a radar system corresponding to the detected radar-system activity, the predicting based on detection times of the radar-system activity at respective ones among the radar sensing units that are associated with the radar-sensing measurements indicating the radar-system activity, and wherein the processing circuitry is configured to set or adapt the radar protection area to account for the predicted movement.

18. The network node of claim 10, wherein the processing circuitry is configured to adapt radar sensing operations, in response to the detected radar-system activity, the adapting of the radar sensing operations comprising increasing how often radar sensing measurements are made by one or more ones of the radar sensing units associated with the radar sensing measurements indicating the radar-system activity, or by one or more ones of the radar sensing units that neighbor the radar sensing units associated with the radar sensing measurements indicating the radar-system activity.

* * * * *